United States Patent
Rabii et al.

(10) Patent No.: US 10,362,347 B1
(45) Date of Patent: Jul. 23, 2019

(54) IN-FLIGHT ENTERTAINMENT SYSTEMS CONTROLLING BLUETOOTH BROADCAST RATES OF TIME MESSAGES AND TIMING OFFSETS BY VIDEO DISPLAY UNITS TO USER TERMINALS

(71) Applicant: Thales Avionics, Inc., Irvine, CA (US)

(72) Inventors: Khosro Rabii, San Diego, CA (US); Jay Eggenberger, Irvine, CA (US)

(73) Assignee: Thales Avionics, Inc., Irvine, CA (US)

( * ) Notice: Subject to any disclaimer, the term of this patent is extended or adjusted under 35 U.S.C. 154(b) by 0 days.

(21) Appl. No.: 16/018,107

(22) Filed: Jun. 26, 2018

(51) Int. Cl.
  *H04N 21/262* (2011.01)
  *H04N 21/214* (2011.01)
  *H04L 29/08* (2006.01)
  *B64D 11/00* (2006.01)
  *H04W 4/80* (2018.01)

(52) U.S. Cl.
  CPC ... *H04N 21/26241* (2013.01); *B64D 11/0015* (2013.01); *H04L 67/125* (2013.01); *H04N 21/2146* (2013.01); *H04W 4/80* (2018.02)

(58) Field of Classification Search
  CPC .................. H04N 21/214; H04N 21/2146
  See application file for complete search history.

(56) References Cited

U.S. PATENT DOCUMENTS

2015/0150061 A1* 5/2015 Bleacher ............. H04N 21/422
                                                                    725/76

* cited by examiner

*Primary Examiner* — Hsiungfei Peng
(74) *Attorney, Agent, or Firm* — Sage Patent Group

(57) ABSTRACT

An inflight entertainment system includes video display units that communicate with user terminals through Bluetooth signaling and include a network interface communicating with a content server and a satellite network interface and/or a ground network interface. A time reference message is received which contains a master time reference from the satellite network interface and/or the ground network interface. A local time generator is updated based on the master time reference. Rate request messages are received from the user terminals containing indications of time broadcast rates requested by the user terminals. A scheduled time broadcast rate is determined based on the indications of the time broadcast rates requested by the user terminals. The video display unit transmits, through a Bluetooth transceiver at time instances which are determined based on the scheduled time broadcast rate, broadcast time messages that each contain an indication of a present local time of the video display unit.

25 Claims, 6 Drawing Sheets

US 10,362,347 B1

IN-FLIGHT ENTERTAINMENT SYSTEMS CONTROLLING BLUETOOTH BROADCAST RATES OF TIME MESSAGES AND TIMING OFFSETS BY VIDEO DISPLAY UNITS TO USER TERMINALS

FIELD OF THE INVENTION

The present disclosure relates to aircraft-based in-flight entertainment systems that communicate with user terminals using Bluetooth communication links.

BACKGROUND

In-flight entertainment (IFE) systems have been deployed onboard aircraft to provide entertainment, such as movies, television, audio entertainment programming, electronic games, and other electronic content to passengers. IFE, systems are increasingly using Bluetooth networks to interconnect seat video display units (SVDUs) to wireless user terminals that can be operated by passengers. Such user terminals can include wireless passenger control units (WPCUs) supplied as aircraft equipment and include passenger electronic devices (PEDs) that are transported onto the aircraft by the passengers. PEDs can include cellular phones, tablet computers, laptop computers, wireless headphones, etc. Passengers can operate the user terminals to select content for playback through display devices and/or speakers within or connected to the SVDUs. Wireless headphone type PEDs can receive audio content through Bluetooth connections to respectively paired SVDUs.

The proliferation of such wireless equipment operating simultaneously and with unsynchronized use of shared radio resources within an aircraft cabin, can result in levels of communication interference that degrade or intermittently prevent operation of the IFE system. For example, hundreds of wireless Bluetooth transceivers within SVDUs, WPCUs, cellular phones, tablet computers, headphones, etc. can be simultaneously transmitting and thereby interfering with each other's communications.

SUMMARY

Some embodiments of the present disclosure are directed to an inflight entertainment system that includes a content server and video display units, such as seat video display units. The content server buffers and/or stores entertainment content. The video display units each include a Bluetooth transceiver that communicates through Bluetooth signaling with user terminals, and a network interface that communicates via a communication network with the content server and a satellite network interface and/or a ground network interface. Each video display unit also contains at least one processor that executes program code in at least one memory to perform operations that include receiving control commands from the user terminals via the Bluetooth transceiver. Entertainment content is obtained from the content server and displayed on the display device responsive to the control commands. A time reference message is received which contains a master time reference from the satellite network interface and/or from the ground network interface. A local time generator is updated based on the master time reference. Rate request messages are received from the user terminals via the Bluetooth transceiver, and which contain an indication of a time broadcast rate that is requested by the user terminal respectively. A scheduled time broadcast rate is determined based on the indications of the time broadcast rates requested by the user terminals. The video display units then transmits, through the Bluetooth transceiver at time instances which are determined based on the scheduled time broadcast rate, broadcast time messages that each contain an indication of a present local time of the video display unit that is generated by the local time generator.

The video display units therefore broadcasts time messages containing its present local time, which can be periodically updated based on the master time reference from the satellite network interface (e.g., satellite clock signal) and/or a ground network interface (e.g., terrestrial cellular clock signal). However, the broadcast time messages are transmitted according to a rate schedule that is determined based on requests received from the user terminals. The rate schedule for the time broadcasts can therefore be adapted based on the present rate requests of one or more of the user terminals, which may change over time depending upon the level of time accuracy that is needed by an application (e.g., distance ranging application based on time-of-flight determination) that is being started-up for execution on the user terminal or which has transitioned to an operational mode that requires higher or lower precision in time accuracy.

Some other embodiments are directed to a Bluetooth controller for distributing a precision local time to user terminals. The Bluetooth controller includes a network interface configured to communicate with a precision time source node, a Bluetooth transceiver configured to communicate through Bluetooth signaling with the user terminals, at least one processor, and at least one memory storing program code executed by the at least one processor to perform operations. The operations include receiving a time reference message containing a master time reference from the precision time source node. A local time generator is updated based on the master time reference. Rate request messages are received from user terminals via the Bluetooth transceiver. Each of the rate request messages contain an indication of a time broadcast rate that is requested by the user terminal respectively. A scheduled time broadcast rate is determined based on the indications of the time broadcast rates requested by the user terminals. The Bluetooth controller transmits through the Bluetooth transceiver at time instances which are determined based on the scheduled time broadcast rate, broadcast time messages that each contain an indication of a present local time of the video display unit that is generated by the local time generator.

Other systems, video display units, and Bluetooth controllers, and corresponding methods and computer program products according to embodiments of the inventive subject matter will be or become apparent to one with skill in the art upon review of the following drawings and detailed description. It is intended that all such additional systems, video display units, and Bluetooth controllers, and corresponding methods and computer program products be included within this description, be within the scope of the present inventive subject matter, and be protected by the accompanying claims. Moreover, it is intended that all embodiments disclosed herein can be implemented separately or combined in any way and/or combination.

BRIEF DESCRIPTION OF THE DRAWINGS

Other features of embodiments will be more readily understood from the following detailed description of specific embodiments thereof when read in conjunction with the accompanying drawings, in which.

DETAILED DESCRIPTION

Figure 1:
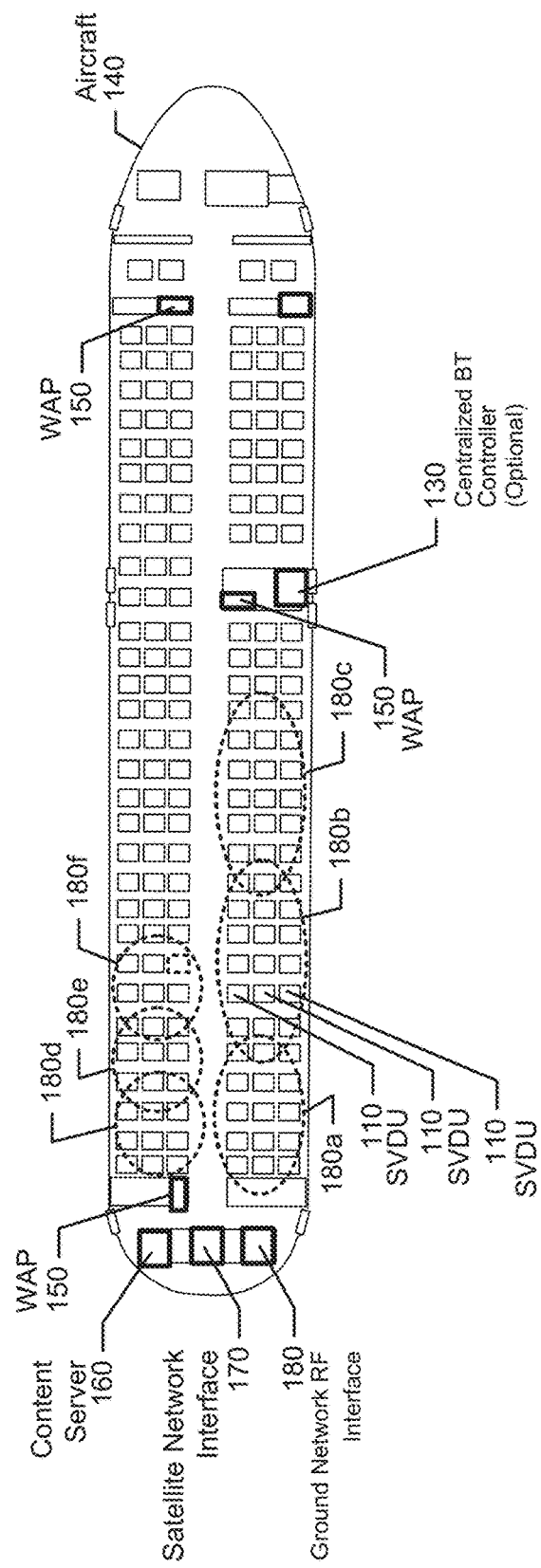
FIG. 1 illustrates an aircraft cabin containing an in-flight entertainment (IFE) system having seat video display units (SVDUs) that schedule transmissions of broadcast time messages to user terminals in accordance with some embodiments of the present disclosure.

In the following detailed description, numerous specific details are set forth in order to provide a thorough understanding of embodiments of the present disclosure. However, it will be understood by those skilled in the art that the present invention may be practiced without these specific details. In other instances, well-known methods, procedures, components and circuits have not been described in detail so as not to obscure the present invention. It is intended that all embodiments disclosed herein can be implemented separately or combined in any way and/or combination.

With the rapid proliferation of Bluetooth as a wireless communication technology of choice for interconnecting SVDUs and user equipment, hundreds of Bluetooth transceivers can now be simultaneously operating within an aircraft cabin. It is important to avoid unnecessary interference with the radio frequencies that are used for Bluetooth communications. Various embodiments of the present invention arise from the realization that improved operational functionality can provide by having SVDUs provide an accurate time reference indication to the user terminals for their use in providing functionality with respect to the SVDUs. Various further embodiments use Bluetooth broadcast messages to transmit accurate time reference indications from SVDUs to user terminals within their radio broadcast range. Operating SVDUs to transmit Bluetooth broadcast messages for purposes of accurate time reference distribution can lead to highly repetitive broadcast messages being sent out by hundreds of SVDUs within an aircraft cabin and potentially create excessive interference to Bluetooth radio communications. Therefore, various embodiments disclosed herein are further directed to operations and methods for controlling the rates at which time broadcast messages are transmitted by individual SVDUs based on the time accuracy needs of the user terminals receiving those messages. These operations may be particularly advantageous for use with Bluetooth Low Energy transceivers which are constrained by industry standard to limiting their beacon advertisement broadcast transmissions to occurring within four particular frequencies, and which consequentially raises the likelihood of excessive interference occurring with those four frequencies shared by hundreds of SVDUs within, for example, the small defined space of an aircraft cabin.

In accordance with some embodiments of the present invention, a Bluetooth controller, which may be within a SVDU, receives a time reference message which contains a master time reference from a satellite network interface (e.g., satellite clock signal) and/or a ground network interface (e.g., terrestrial cellular clock signal). A local time generator is updated based on the master time reference. The Bluetooth controller, such as within the SVDU, controls the rate at which broadcast time messages are transmitted through the Bluetooth transceiver to user terminals based on the rates at which the user terminals indicate that they need to receive time message updates. More particularly, the Bluetooth controller receives rate request messages from the user terminals via the Bluetooth transceiver. The rate request messages each contain an indication of a time broadcast rate that is requested by the user terminal respectively. A scheduled time broadcast rate is determined based on the indications of the time broadcast rates requested by the user terminals. The Bluetooth controller then transmits, through the Bluetooth transceiver at time instances which are determined based on the scheduled time broadcast rate, broadcast time messages that each contain an indication of a present local time of the SVDU that is generated by the local time generator. The broadcast time messages may be transmitted as Bluetooth Low Energy beacon advertisement messages. These and other related embodiments are explained below in the context of FIGS. 1-8.

Various embodiments are explained below in the non-limiting context of an In-Flight Entertainment (IFE) system that includes seat video display units (SVDUs) that communicate through Bluetooth connections with user terminals, which are also referred to as passenger control units (PCUs) and passenger electronic devices (PEDs). The PCUs can be supplied as aircraft equipment. The PEDs can be transported onto the aircraft by the passengers and include mobile phones, tablet computers, laptop computers, wireless Bluetooth headphones, etc. The SVDUs and user terminals each include Bluetooth transceivers that are configured to transmit and receive radio frequency (RF) signals, such as in the ISM band. Although various embodiments herein are primarily described in the context of an IFE system deployed onboard an aircraft, the invention is not limited thereto. Instead, these and other related embodiments may be used to control wireless communication transceivers located in other types of vehicles, including without limitation, trains, automobiles, cruise ships, and buses, and in other non-vehicle installations, including without limitation, meeting rooms, sports stadiums, etc.

Embodiments are also described in the non-limiting context of the Bluetooth transceivers being configured to transmit and receive using radio resources in the ISM band. As used herein, the term "ISM band" refers to one or more frequency ranges that are reserved internationally for the use of radio frequency energy for unlicensed and/or licensed communications. The term "band" can refer to one continuous frequency range or a plurality of non-continuous frequency ranges that are defined by the ITU Radio Regulations for ISM communications.

Example Aircraft IFE System

FIG. 1 illustrates an aircraft fuselage 140 containing an IFE system that provides entertainment services to passengers. The IFE system can include a content server 160 that buffers (e.g., buffers entertainment content received via a satellite radio distribution network interface 170 and/or a terrestrial radio distribution network interface 180) and/or stores entertainment content for distribution through wired networks (e.g., Ethernet) and/or through wireless access points (WAPs) 150 to seat video display units (SVDUs) 110 that may be mounted to structures within the aircraft, including to seatbacks, seat armrests/frames, bulkheads, overhead structures, etc. The content server 160 may additionally stream and/or download electronic content through WAPs 150 to WPCUs and/or to PEDs. The SVDUs 110 each contain a Bluetooth transceiver that wirelessly communicates through ISM band RF signaling with Bluetooth transceivers within the user terminals. The WPCUs may be configured to be releasable docked to armrest docket stations and/or to docket stations connected to or adjacent to some or all of the SVDUs 110. The Bluetooth transceiver within a SVDU 110 is understood to be the communication circuitry (i.e., transceiver, signal processor, protocol controller, etc.) which may be incorporated within the same housing that at least partially encloses a display device, video display circuitry, network interface, and other circuitry providing functionality for the SVDU 110.

The SVDUs 110 may each be paired to, for example, one WPC and numerous PEDs brought on board by passenger, such as a wireless headphone, a mobile phone, a tablet computer, a laptop computer, etc. The broadcast message communication range of the Bluetooth transceivers within each SVDU 110 can extend across many seats, such as the illustrated six broadcast message communication areas 180a-180f that may be created by six spaced apart SVDUs 110. The broadcast message communication areas of the SVDUs 110 can have different sizes and shapes depending upon, for example, the transmission power level of the respective Bluetooth transceiver in the SVDU 110, proximately located objects (e.g., fuselage, bulkheads, seat structures, passengers, etc.) that reflect or absorb RF transmissions, etc.

Although various embodiments are described in the context of some or all SVDUs 110 including a Bluetooth controller that is configured to determine a scheduled time broadcast rate at which broadcast time messages are to be transmitted to user terminals, in some other embodiments the IFE system includes a centralized Bluetooth controller 130 which may be used in addition to or instead of providing Bluetooth controllers within the SVDUs 110. The centralized Bluetooth controller 130 may operate to centrally decide a scheduled time broadcast rate that is to be used by SVDUs 110 within various regions of the aircraft based on the time broadcast rates that are needed by the user terminals within the respective broadcast message communication ranges of the respective SVDUs 110. The centralized Bluetooth controller 130 may communicate through a wired network (e.g., ethernet) and/or through the WAPs 150 with the SVDUs 110 to receive indications of the broadcast rates which user terminals are indicating that they request, and to send the scheduled time broadcast rates that are determined for particular ones of the SVDUs 110 or four groups of SVDUs 110 to those particular SVDU(s) 110.

Example Elements of an IFE System

Figure 2:
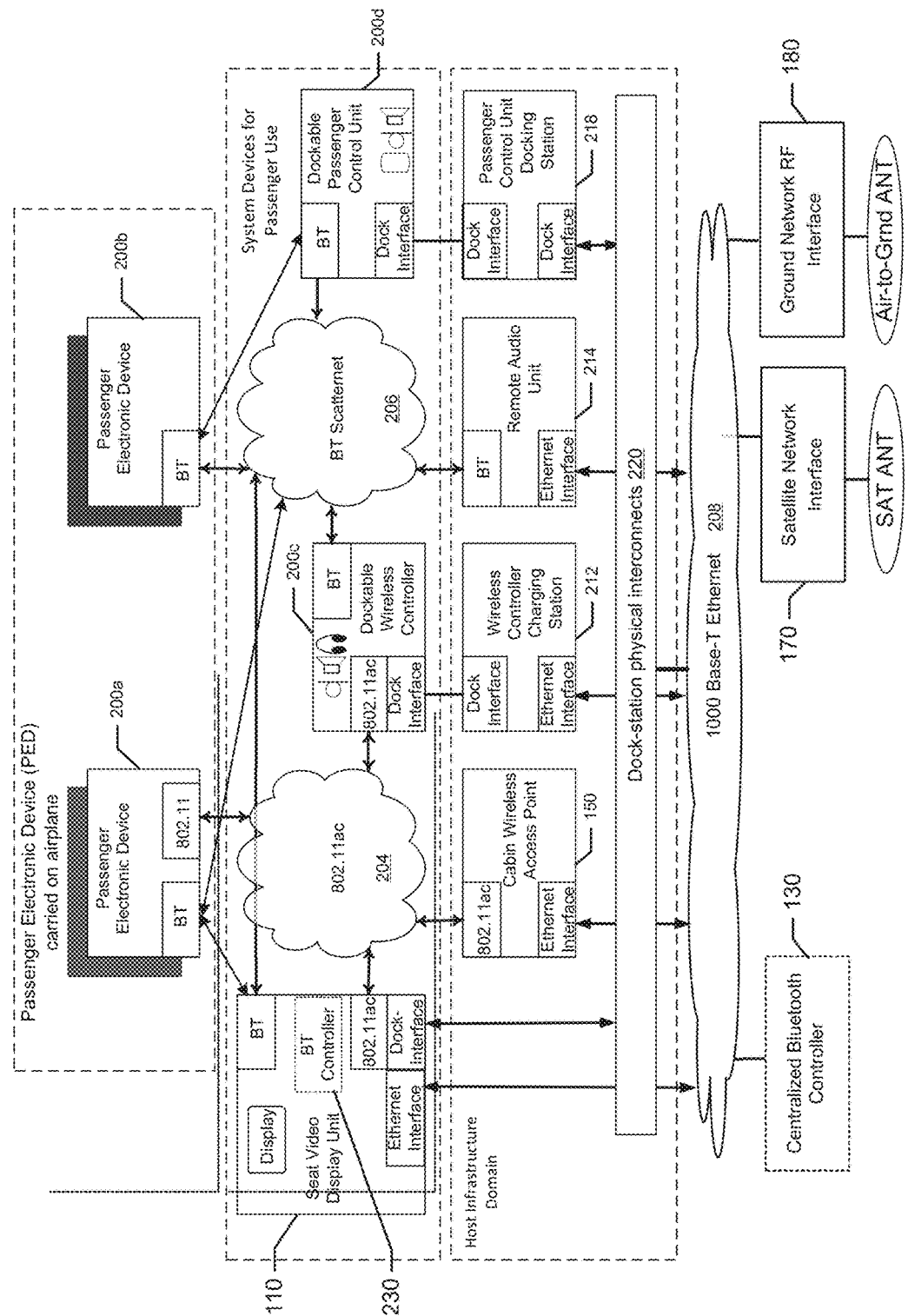
FIG. 2 is a block diagram illustrating the IFE system of FIG. 1 having elements that are configured to operate in accordance with some embodiments of the present disclosure.

FIG. 2 is a block diagram of the IFE system of FIG. 1 having elements that are configured to operate in accordance with some embodiments of the present disclosure. Referring to FIG. 2, the IFE system includes system devices that can be located at each passenger seat location, and which is configured to communicate with various types of user terminals that can be provided by the airline and/or carried on-board by passengers. The seat-located system devices can communicate using RF resources within the ISM band with the user terminals using a Bluetooth (BT) scatternet wireless network 206 and may use an IEEE 802.11ac wireless network 204. The example user terminals include PEDs 200a having both a Bluetooth transceiver and a IEEE 802.11 (WiFi) transceiver and other user terminals 200b having a Bluetooth transceiver.

The system devices can include a SVDU 110, a dockable wireless controller 200c, and a dockable PCU 200d. The system may include only one or both of the dockable wireless controller 200c and the dockable passenger control unit 200d, which may be the same or similar type of device or may be different types of devices, and which can be collectively referred to as wireless controllers. The dockable wireless controller 200c and the dockable PCU 200d can be operated by a passenger to wirelessly control the SVDU 110, such as to select content that is consumed (e.g., played through a display device), select among menu items, and control other operations of the SVDU 110. Audio content may be streamed through the Bluetooth connection from the SVDU 110 to a user terminal, e.g., Bluetooth headphones. Pictures, video, textual information, and/or commands may be communicated from the SVDU 110 to a user terminal through the Bluetooth connection.

The example SVDU 110 includes a display device, video display circuitry, a general-purpose processor, a Bluetooth transceiver, and an Ethernet interface or other wired network interface. In accordance with some embodiments, some or all of the SVDUs 110 include a Bluetooth controller 230 that receives a time reference message containing a master time reference (e.g., from a satellite network interface 170 (e.g., satellite clock signal) and/or a ground network interface 180 (e.g., terrestrial cellular clock signal)). The Bluetooth controller 230 updates a local time generator based on the master time reference. The Bluetooth controller 230 controls the rate at which broadcast time messages are transmitted through the Bluetooth transceiver to user terminals (e.g., 200a-d, 214, etc.) based on the rates at which the user terminals indicate that they need to receive time message updates. More particularly, the Bluetooth controller 230 receives rate request messages from the user terminals via the Bluetooth transceiver. The rate request messages each contain an indication of a time broadcast rate that is requested by the user terminal respectively. A scheduled time broadcast rate is determined based on the indications of the time broadcast rates requested by the user terminals. The Bluetooth controller 230 then transmits, through the Bluetooth transceiver at time instances which are determined based on the scheduled time broadcast rate, broadcast time messages that each contain an indication of a present local time of the SVDU that is generated by the local time generator. The broadcast time messages may be transmitted as Bluetooth Low Energy beacon advertisement messages. The broadcast time messages can be in the form of an 'advertisement' which is a unidirectional communication from the Bluetooth transceiver of the SVDU 110. The broadcast time messages are transmitted using the defined broadcast frequencies without needing prior bonding (pairing) connection to any of the user terminals.

The dockable wireless controller 200c includes a general-purpose processor, a Bluetooth transceiver, and a dock wired interface, and may include display circuitry connected to a display device, and audio decoding circuitry connected to a wired headphone jack and/or the Bluetooth transceiver for wireless communication with a passenger's wireless headset. The dockable PCU 200d can similarly include a general-purpose processor, a Bluetooth transceiver, and a dock wired interface, and may include display circuitry connected to a display device, and audio decoding circuitry connected to a wired headphone jack and/or the Bluetooth transceiver for wireless communication with a passenger's wireless headset. The wireless controller 200c, the passenger control unit 200d and dockable passenger control unit 200d, collectively referred to as wireless controller 200, may be configured as handheld devices for operation by passengers and can be stored in docking stations, which may be configured to recharge batteries within the handheld devices. A wireless controller 200 may be a handheld device that is owned by the aircraft operator and provided for temporary use by a passenger during a flight, or may be a PED carried on-board by passengers, such as mobile phones, tablet computers, laptop computers, wireless headphones, etc.

The seat-located system devices are connected to host infrastructure that can include the cabin wireless access points 150 spaced apart within the aircraft cabin and mounted to cabin ceiling structures, storage bin structures, bulkheads, etc. An Ethernet backbone network 208, e.g., 100 Base-T Ethernet, extends throughout the aircraft cabin to communicatively interconnect the seat-located system devices to the content server 160 and the wireless access points 150. The wireless access points 150 can each include an 802.11ac or other WiFi transceiver and an Ethernet interface that connects to the Ethernet backbone network 208.

The host infrastructure can include a PCU docking station 218, a wireless controller charging station 212 (although its functionality may be incorporated into the docking station 218), and a remote audio unit 214. The wireless controller charging station 212 may be located at each seat and have a dock interface that releasably stores the dockable wireless controller 200c and charges a battery therein, and has an Ethernet interface that connects to the Ethernet backbone network 208. The PCU docking station 218 may also be located at each seat and have a dock interface that releasably stores the dockable PCU 200d and charges a battery therein, and has an Ethernet interface that connects to the Ethernet backbone network 208.

The SVDU 110 facing a seat includes a processor that is connected to communicate through a Bluetooth transceiver and through the wired interface of the docking station 218. A wireless controller (PCU) 200 includes a processor connected to communicate through a wired interface and a Bluetooth transceiver. The wireless controller 200 is configured to be releasably docked in the docking station 218 to communicatively connect the wired interfaces of the wireless controller 200 and the docking station 218. While docked in the docking station 218 the processor of the wireless controller 218 and the processor of the display unit 110 may be configured to communicate through the wired interfaces of the wireless controller 200 and the docking station 218, via a dock-station physical interconnects (e.g., wired connections) 220, to establish a Bluetooth connection between the Bluetooth transceivers of the wireless controller 200 and the display unit 110.

The system may optionally include the central Bluetooth controller 130 that is communicatively connected to the SVDUs 110 through the Ethernet backbone network 208 and/or through the WiFi 802.11 network 204. The SVDUs 110 are further connected to receive time reference messages via the ethernet 208 which are generated based on communications received through the satellite network interface 170 from a satellite network via the satellite antenna 172 and/or communications received through the ground network RF interface 180 from a terrestrial RF communication network via the air-to-ground antenna 182.

The remote audio unit 214 may be located at each seat or adjacent to a group of seats, and can contain a wired headphone jack, a Bluetooth transceiver, and an Ethernet interface that connects to the Ethernet backbone network 208, to receive and play audio through a loudspeaker and/or through the Bluetooth transceiver and/or the wired headphone jack to a headset worn by one or more passengers.

Figure 3:
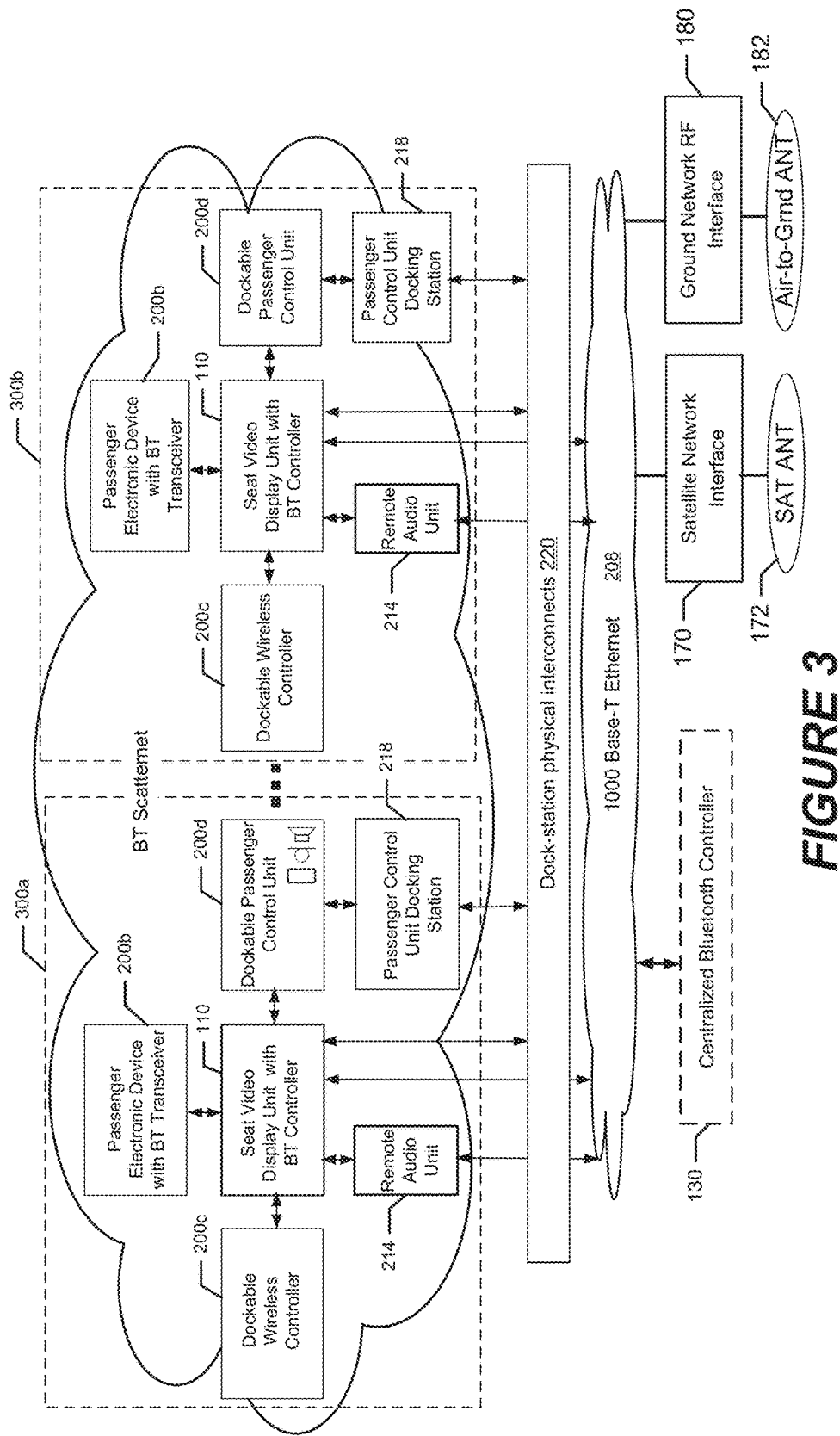
FIG. 3 is another block diagram of the IFE system of FIGS. 1-2 having elements that are configured to operate in accordance with some embodiments of the present disclosure.

FIG. 3 is another block diagram of the IFE system of FIGS. 1-2 having elements that are configured to operate in accordance with some embodiments of the present disclosure. Referring to FIG. 3, an example configuration of components is illustrated for two spaced apart seat locations 300a and 300b. Each seat location 300a/300b is illustrated as being configured to include a passenger equipment with Bluetooth transceiver 200b, a dockable wireless controller 200c, a SVDU 110, a dockable passenger controller unit 200d, a remote audio unit 214, and a passenger control unit docking station 218. These per-seat component configurations can be replicated for any number of seat locations, and one or more of the components that is illustrated as being replicated at each seat location may instead be connected to serve components at more than one seat location.

A dockable wireless controller 200c and a dockable passenger control unit 200d are paired with a particular SVDU 110 while whey they are docked in docking station 218. The dockable wireless controller 200c and a dockable passenger control unit 200d are collectively referred to as wireless controller 200. As explained above, while docked in the docking station 218 the processor of the wireless controller 200 and the processor of the SVDU 110 may be configured to communicate through the wired interfaces of the wireless controller 200 via the dock-station physical interconnects (i.e., wired connections) 220 and the docking station 218.

Figure 4:
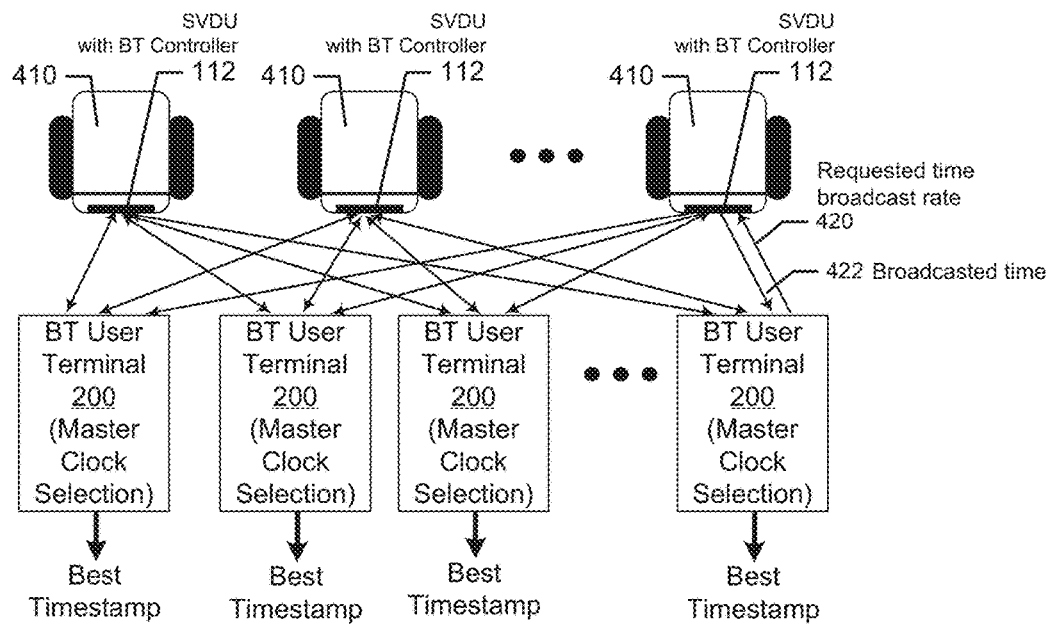
FIG. 4 illustrates SVDUs that receive rate request messages from user terminals via Bluetooth signalling and transmit broadcast time messages to the user terminals via Bluetooth signaling in accordance with some embodiments of the present disclosure.

Example SVDUs Receiving Requested Time Broadcast Rates and Transmitting Broadcast Time Messages FIG. 4 illustrates SVDUs 110 that receive rate request messages from user terminals 200 via Bluetooth signalling and transmit broadcast time messages to the user terminals 200 via Bluetooth signaling in accordance with some embodiments of the present disclosure. The example SVDUs 110 are mounted in the backs of passenger seats 410 along an illustrated row of the seats 410. The SVDUs 110 use master time reference signals received from the satellite network interface and/or from the ground network interface to generate accurate local time clocks. Because the SVDUs 110 can all receive the same master time reference signals, their local time clocks can be nearly identical, except due to effects of their respective local time generator clock drift, different communication delays with individually receiving and processing the master time reference signals, etc. Each SVDU 110 transmits Bluetooth broadcast time messages 422 which each contain an indication of a present local time of the SVDU that is generated by its local time generator.

Providing the user terminals with an accurate common time reference can enable the user terminals operating in conjunction with the SVDUs to have accurate concurrency control, data consistency/ordering, security, communication protocol management, etc. System performance and Quality of Service (QoS) of the applications executed by the user terminals and SVDUs and by the communications therebetween can be improved through use of the accurate common time reference.

The broadcast time messages may be transmitted as Bluetooth Low Energy beacon advertisement messages. The broadcast time messages can be in the form of an 'advertisement' which is a unidirectional communication from the Bluetooth transceiver of the SVDU 110. The broadcast time messages are transmitted using the defined broadcast frequencies without needing prior bonding (pairing) connection to any of the user terminals.

Because of the close physical spacing of the seats 410 and the Bluetooth broadcast communication range of the SVDUs 110, each of the illustrated Bluetooth user terminals 200 receives the Bluetooth broadcast time messages that are transmitted by each of the SVDUs 110. The Bluetooth user terminals 200 may operate to: receive the Bluetooth broadcast time messages 422 from each of the illustrated SVDUs 110 which can be transmitted at different rates by the different SVDUs 110; determine the present local time that is indicated within each of the received Bluetooth broadcast time messages 422; select one or more of the indicated present local times as a best timestamp; and use the best timestamp to selectively update a master clock within the user terminal 200 to improve the local time accuracy used by applications performed by the user terminal 200 (e.g., Bluetooth ranging applications, etc.)

Because each illustrated user terminal 200 receives the Bluetooth broadcast time messages 422 transmitted by each of the SVDUs 110, the SVDUs 110 can therefore interfere with each other's Bluetooth broadcast transmissions as they repetitively transmit their Bluetooth broadcast time messages over the four defined Bluetooth broadcast frequencies which they are constrained to use for Bluetooth Low Energy advertisement beacon broadcast transmissions.

In accordance with various embodiments herein, the user terminals 200 each transmit rate request messages 420 each containing an indication of a time broadcast rate that is requested by the user terminal 200. The SVDUs 110 each receive the rate request messages, and determine a scheduled time broadcast rate based on the indications of the time broadcast rates requested by the user terminals 200. The SVDUs 110 then each control their transmissions through their respective Bluetooth transceiver, at time instances which are determined based on the scheduled time broadcast rate, of broadcast time messages. Each of the broadcast time messages contain an indication of a present local time of the SVDU 110 that is generated by its local time generator that was updated based on the master time reference.

Example Bluetooth Transceiver and Central Processor of a User Terminal

Figure 5:
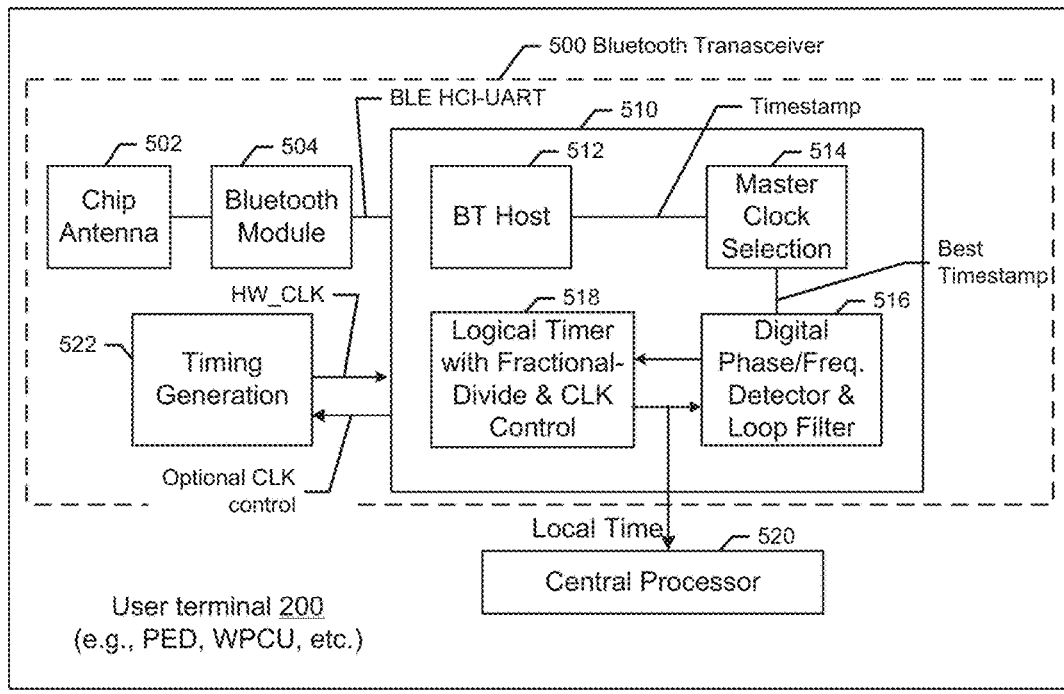
FIG. 5 is a block diagram of a Bluetooth transceiver and central processor of a user terminal which are configured in accordance with some embodiments of the present disclosure.

FIG. 5 is a block diagram of a Bluetooth transceiver 500 and central processor 520 of a user terminal 200 which are configured in accordance with some embodiments of the present disclosure. The example Bluetooth transceiver 500 includes a chip antenna 502 interconnected to a Bluetooth module 504 that performs RF up-conversion for transmission signals and RF down-conversion to baseband for received signals. A Bluetooth transceiver module 510 includes a Bluetooth host 512 that controls Bluetooth signaling according to one or more defined Bluetooth protocols. A master clock selection module 514 select best timestamps from among the received Bluetooth broadcast time messages 422. The best timestamps are used to synchronize a digital phase and/or frequency detector and loop filter 516, which controls timing of fractional division and/or clock control of a logical timer 518. The logical timer 518 outputs a local time reference that is used by one or more applications being executed by the central processor 520. A timing generator 522 provides a hardware clock reference to the Bluetooth transceiver module 510, and may receive and optional clock control signal from, for example, the logical timer 518.

Operations by User Terminal, SVDU, and Satellite/Ground Network Interface

Figure 6:
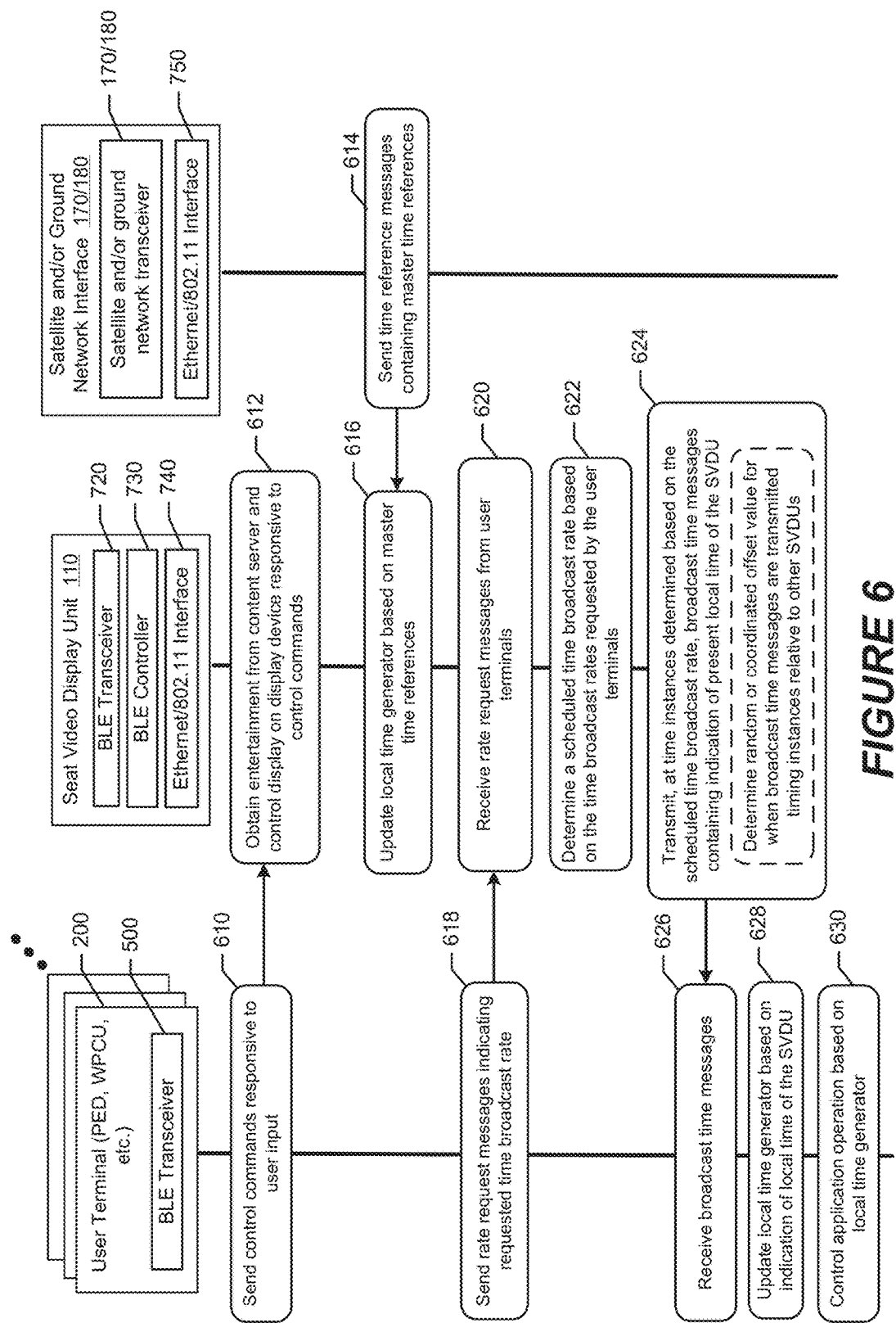
FIG. 6 is a combined block diagram and data flow diagram illustrating operations by a user terminal, a SVDU, and a satellite network interface and/or a ground network interface, each operating in accordance with some embodiments of the present disclosure.

FIG. 6 is a combined block diagram and data flow diagram illustrating operations by a user terminal 200, a SVDU 110, and a satellite network interface 170 and/or a ground network interface 180, each operating in accordance with some embodiments of the present disclosure.

Referring to FIG. 6, the SVDU 110 includes a Bluetooth transceiver 720 (e.g., Bluetooth Low Energy, BLE), a Bluetooth (BLE) controller 730, and a network interface 740 (e.g., ethernet and/or the WLAN, 802.11). The satellite/ground network interface 170/180 includes a satellite network transceiver and/or a ground network interface, and further includes a network interface 750 (e.g., ethernet and/or the WLAN, 802.11).

The user terminal 200 and the SVDU 110 can perform conventional operations that can include the user terminal sending 610 control commands responsive to user input 610 to the SVDU 110 which select menu options for triggering display of selected entertainment content on a display device of the SVDU 110, and/or to control other display functionality of the display device. The SVDU 110 can respond to certain control commands by obtaining 612 from the content server 160 (e.g., by downloading entertainment content files therefrom, triggering streaming of entertainment content therefrom, and/or tuning to frequencies and/or multi-cast addresses to receive streaming content therefrom).

The satellite/ground network interface 170/180 receives time signaling through a satellite network and/or a terrestrial RF network, and generates a master time reference therefrom. The network interface 170/180 sends 614 time reference messages to the SVDU 110, for each of the time reference messages contains the master time reference. The SVDU 110 can respond to each receipt of a time reference message by updating 616 a local time generator based on the master time reference that is received.

To enable more efficient use of the Bluetooth broadcast RF frequencies the user terminals 200 and the SVDUs 110 coordinate as to what rate periods various applications being executed by the various user terminals 200 need to receive time updates from the SVDUs 110. The SVDUs 110 then determine their respective rates at which they will be broadcasting time messages toward the user terminals 200 based on the needs of the applications on the user terminals 200. Each SVDU 110 can thereby avoid transmitting broadcast time messages at rates that are higher than what the applications being executed by the user terminals 200 would benefit from or otherwise require. Similarly, each SVDU 110 can also avoid transmitting broadcast time messages at rates that are lower than what the applications require in order to effectively operate. The SVDUs 110 can dynamically and individually modify their time broadcast rates to track changing rate requests from the user terminals 200 over time.

With continued reference to example operations of FIG. 6, the user terminal 200 sends 618 a rate request message to the SVDU 110 indicating what rate it (applications and/or operating system executed by the user terminal) wants to receive time broadcasts. The SVDU 110 (i.e., the BLE controller 730) receives 620 rate request messages from the user terminal 200 along with other user terminals within its Bluetooth transceiver 720 communication range. Each of the rate request messages contains an indication of a time broadcast rate that is requested by the user terminal respectively. The SVDU 110 (i.e., the BLE controller 730) determines 622 a scheduled time broadcast rate based on the indications of the time broadcast rates requested by the user terminals. The SVDU 110 (i.e., the BLE controller 730) then transmits 624 through the Bluetooth transceiver 720, at time instances which are determined based on the scheduled time broadcast rate, broadcast time messages that each contain an indication of a present local time of the SVDU 110 that is generated by the local time generator.

The user terminal 200 receives 626 the broadcast time messages, updates 628 its local time generator (e.g., updates a time reference use by local time generator) based on the indication of the present local time of the SVDU 110. The user terminal 200 then controls 630 operations of applications is executing and/or controls its operating system based on timing events generated by the local time generator.

The BLE controller 730 of the SVDU 110 can use many different approaches to determine what rate it should use to transmit the broadcast time messages, some of which are described below.

In one embodiment, the operations by the BLE controller 730 to determine a scheduled time broadcast rate include determining from the rate request messages that are received 620, a set of time broadcast rates that the user terminals 200 are requesting that the SVDU 110 broadcast the indications of the present local time of the video display unit. The BLE controller 730 then sets the scheduled time broadcast rate to a value of a highest one of the time broadcast rates in the set of time broadcast rates, and transmits 624 the broadcast time messages at time instances that are determined based on the scheduled time broadcast rate.

In another embodiment, the operations by the BLE controller 730 to determine a scheduled time broadcast rate include determining a relative priority level of each of the time broadcast rates requested by the user terminals 200. The BLE controller 730 then determines the scheduled time broadcast rate based on one of the time broadcast rates having a priority level that satisfies a defined prioritization rule, and transmits 624 the broadcast time messages at time instances that are determined based on the scheduled time broadcast rate.

The BLE controller 730 may determine the priority level based on information contained in the rate request messages that are received 620. For example, the rate request messages that are received 620 from the user terminals 200 further contain an indication of a priority level. The BLE controller 730 determines the relative priority levels of the time broadcast rates requested by the user terminals 200 based on the associated indications of the priority levels received in the rate request messages.

Alternatively or additionally, the BLE controller 730 may determine the priority level based on which type of service being provided by the user terminals 200 will be using the time updates from the SVDU 110. For example, the rate request messages that are received 620 from the user terminals 200 can each contain an indication of which type of service from among a plurality of defined types of services that can be provided by the user terminals 200 will be using the present local times transmitted by the SVDU 110 via the broadcast time messages. The BLE controller 730 then determines the relative priority levels of the time broadcast rates requested by the user terminals 200 based on the types of service indicated by the associated rate request messages.

By way of further example, the operations by the BLE controller 730 to determine the relative priority levels of the time broadcast rates requested by the user terminals 200 can include providing a first priority level to a time broadcast rate requested by one of the user terminals 200 that will be using the present local times transmitted by the SVDU 110 to report ranging indications to the SVDU 110, and providing a second priority level to another time broadcast rate requested by another one of the user terminals 200 that will be using the present local times transmitted by the SVDU 110 to report user commands that have been entered through the user terminal 200 to the SVDU 110. The operations to determine a scheduled time broadcast rate based on the indications of the time broadcast rates requested by the user terminals 200 provide a higher priority to selecting the time broadcast rate associated with the first priority level over the time broadcast rate associated with the second priority level. For example, range determination algorithms are highly sensitive to errors in time reference used for signal propagation time-based ranging. Accordingly, a higher broadcast rate can be used to broadcast time updates more frequently to a user terminal having a ranging application that is executing and using the time updates to maintain an accurate clock reference used to determine distance between the user terminal and the SVDU or another object.

In some other embodiments, the operations by the BLE controller 730 to determine a scheduled time broadcast rate include identifying one of the user terminals 200 that has had an operational error that is related to a service performed by the user terminal 200 which uses the present local times transmitted by the SVDU 110 via the broadcast time messages. The BLE controller 730 then sets the scheduled time broadcast rate to be at least as high as the time broadcast rate that was requested by the user terminal 200 that was identified as having the operational error.

The operations to identify one of the user terminals 200 that has had an operational error, can include identifying that the user terminal 200 has exhibited a lack of communication response to the SVDU 110 responsive to communication signaling transmitted by the SVDU 110 through the Bluetooth transceiver 720 and/or a communication response latency which exceeds a latency threshold in responding to the communication signaling.

Alternatively or additionally, the operations to identify one the user terminals 200 that has had an operational error that is related to a service performed by the user terminal 200 which uses the present local times transmitted by the SVDU 110, can include identifying that the user terminal 200 is reporting range indications from the SVDU 110 that have errors exceeding an error threshold.

The BLE controller 730 of the SVDU 110 may communicate with BLE controller 730 of other SVDUs via the ethernet/802.11 network interface 742 to collectively determine what rates they should respectively broadcast their time messages to user terminals 200 which are within their respective communication service areas. As was illustrated in FIG. 4, depending upon where user terminals 200 are located, they can receive broadcast time messages from a plurality of spaced apart SVDUs 110. For example, the user terminal located at one seat may receive broadcast time messages from SVDUs located at seats along the same row and also located at forward and rearward immediately adjacent rows. In some embodiments, the BLE controller 730 can communicate a list of user terminal identifiers and their requested broadcast rates to other SVDUs 110 for use in determining what broadcast rate each of the SVDUs 110 should use when transmitting broadcast time messages to those user terminals 200.

In one embodiment the operations by the BLE controller 730 to determine a scheduled time broadcast rate include communicating with other BLE controller 730 of other SVDUs 110 via the network interface 740 to obtain therefrom a list of user terminals that are determined by the other SVDUs 110 to be within their respective communication range. The BLE controller 730 responsively provides a higher priority to determining the scheduled time broadcast rate to be at least as high as a highest one of the indications of the time broadcast rates that are requested by any of the user terminals 200 that are determined to be within the communication range of the SVDU 110 but to not be contained in any of the lists of the user terminals 200 that are received from the other ones of the SVDUs 110. Accordingly, in this scenario, when a particular user terminal 200 is within the broadcast message range of a particular SVDU 110 but not within the broadcast range of other SVDUs 110 that have reported such lists, the particular SVDU 110 can prioritize providing broadcast time messages at a rate needed by the particular user terminal 200.

Operations by SVDU to Randomize or Coordinate Timing of Broadcast Time Message

The BLE controller 730 of a SVDU 110 can operate to reduce RF congestion by randomizing the timing of the instances when it transmits broadcast time messages at the scheduled time broadcast rate that was determined. The BLE controller 730 may control the BLE transceiver 722 regularly sleep between broadcast events in a way transmitted according to randomized order and frequency that has been determined. The determination of the randomized order and frequency may be determined by a collection of the Bluetooth controllers 730 hosted by a group of SVDUs 110.

With further reference to FIG. 6, the SVDU 110 can transmit at time instances that have been determined 625 based on a random and/or coordinated offset value for when the broadcast time messages are transmitted relative to other SVDUs 110. In one embodiment, the Bluetooth controller 720 communicates with other SVDUs 110 via the network interface 740 to coordinate different broadcast time offset values. For example, SVDUs 110 that are located at three adjacent seats along a row may communicate to determine different time offset values that they will each use so as to reduce or avoid overlapping time instances when they are broadcasting their time messages to user terminals 200. Each respective one of the SVDUs 110 performs operations to determine repetitive occurrence of the time instances, when the broadcast time messages are transmitted through the Bluetooth transceiver 720 of the respective SVDU 110, based on a combination of the random time offset value of the respective SVDU 110 and the present local times of the respective SVDU 110 that are generated by the local time generator of the respective SVDU 110.

Example Seat Video Display Unit and User Terminal

Figure 7:
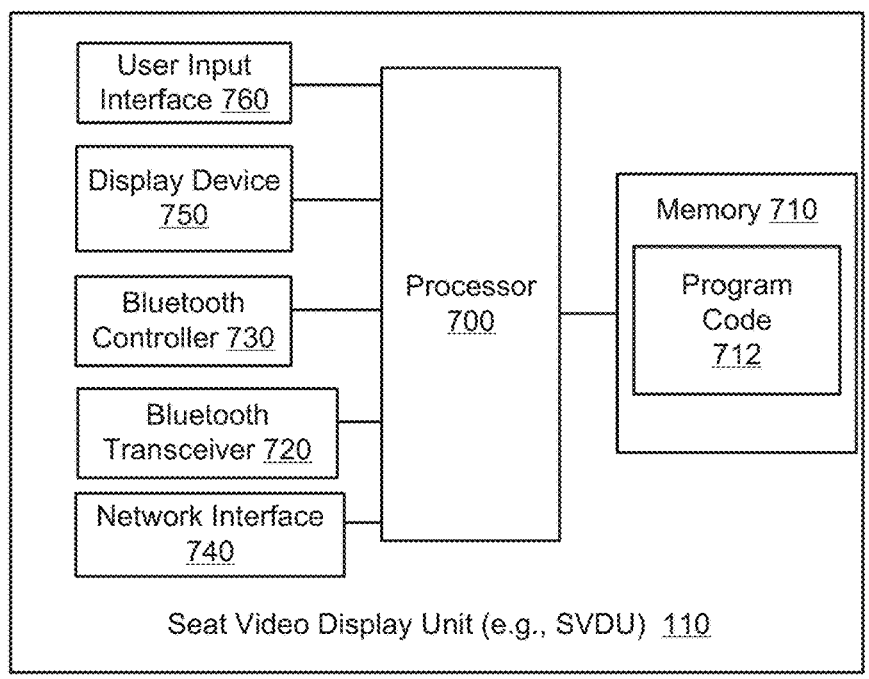
FIG. 7 is a block diagram of elements of a seat video display unit which are configured to operate in accordance with some embodiments of the present disclosure.

FIG. 7 is a block diagram of elements of a SVDU 110 which are configured to operate in accordance with some embodiments of the present disclosure. The SVDU 110 includes at least one processor 700 (processor for brevity), at least one memory 710 (memory for brevity) storing program code 712, a Bluetooth transceiver 720, a Bluetooth controller 730, a network interface 740, a display device 750, and a user input interface 760.

The processor 700 may include one or more data processing circuits, such as a general purpose and/or special purpose processor (e.g., microprocessor and/or digital signal processor) that may be collocated or distributed across one or more networks. The processor 700 is configured to execute computer program code 712 in the memory 710, described below as a non-transitory computer readable medium, to perform at least some of the operations described herein as being performed by a SVDU 110. The computer program code 712 when executed by the processor 700 causes the processor 700 to perform operations in accordance with one or more embodiments disclosed herein for the SVDUs and other display units disclosed herein. The processor 700 may controls what content is played (e.g., television shows, movies), displayed (e.g., electronic books), executed (e.g., gaming programs), and/or otherwise consumed through the SVDU 110 responsive to commands received through the Bluetooth transceiver 730 from various user terminals 200.

Figure 8:
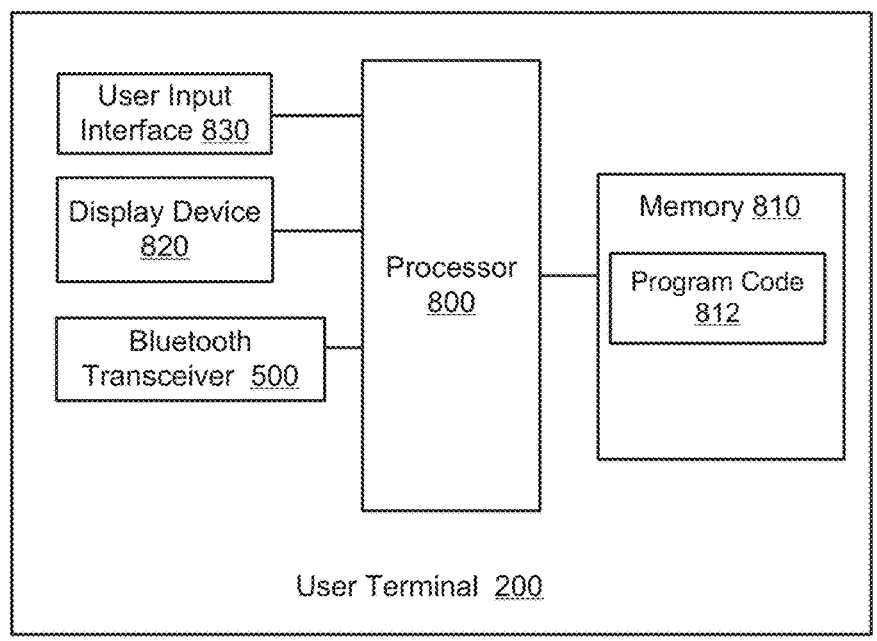
FIG. 8 is a block diagram of elements of a user terminal which are configured to operate in accordance with some embodiments of the present disclosure.

FIG. 8 is a block diagram of elements of a user terminal 200 which are configured to operate in accordance with some embodiments of the present disclosure. The user terminal 200 includes at least one processor 800 (processor for brevity), at least one memory 810 (memory for brevity) storing program code 812, a Bluetooth transceiver 500, a display device 820, and a user input interface 830.

The processor 800 may include one or more data processing circuits, such as a general purpose and/or special purpose processor (e.g., microprocessor and/or digital signal processor) that may be collocated or distributed across one or more networks. The processor 800 is configured to execute computer program code 812 in the memory 810, described below as a non-transitory computer readable medium, to perform at least some of the operations described herein as being performed by an access control computer. The computer program code 812 when executed by the processor 800 causes the processor 800 to perform operations in accordance with one or more embodiments disclosed herein for the user terminals 200 disclosed herein.

Further Definitions and Embodiments

In the above-description of various embodiments of the present disclosure, aspects of the present disclosure may be illustrated and described herein in any of a number of patentable classes or contexts including any new and useful process, machine, manufacture, or composition of matter, or any new and useful improvement thereof. Accordingly, aspects of the present disclosure may be implemented in entirely hardware, entirely software (including firmware, resident software, micro-code, etc.) or combining software and hardware implementation that may all generally be referred to herein as a "circuit," "module," "component," or "system." Furthermore, aspects of the present disclosure may take the form of a computer program product comprising one or more computer readable media having computer readable program code embodied thereon.

Any combination of one or more computer readable media may be used. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

It is to be understood that the terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

The flowchart and block diagrams in the figures illustrate the architecture, functionality, and operation of possible implementations of systems, methods, and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Like reference numbers signify like elements throughout the description of the figures.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

The invention claimed is:

1. An inflight entertainment system comprising:
   a content server buffering and/or storing entertainment content;
   a plurality of video display units, each comprising:
      a network interface configured to communicate via a communication network with the content server and a satellite network interface and/or a ground network interface;
      a Bluetooth transceiver configured to communicate through Bluetooth signaling with user terminals;
      a display device;
      at least one processor; and
      at least one memory storing program code executed by the at least one processor to perform operations comprising:
         receiving control commands from the user terminals via the Bluetooth transceiver;
         obtaining entertainment content from the content server and controlling display of the entertainment content on the display device responsive to the control commands;
         receiving a time reference message containing a master time reference from the satellite network interface and/or from the ground network interface;
         updating a local time generator based on the master time reference;
         receiving rate request messages from the user terminals via the Bluetooth transceiver, each of the rate request messages containing an indication of a time broadcast rate that is requested by the user terminal respectively;
         determining a scheduled time broadcast rate based on the indications of the time broadcast rates requested by the user terminals; and
         transmitting through the Bluetooth transceiver, at time instances which are determined based on the scheduled time broadcast rate, broadcast time messages that each contain an indication of a present local time of the video display unit that is generated by the local time generator.

2. The inflight entertainment system of claim 1, wherein the operations to determine a scheduled time broadcast rate based on the indications of the time broadcast rates requested by the user terminals, further comprise:
   determining from the rate request messages a set of time broadcast rates that the user terminals are requesting that the video display unit broadcast the indications of the present local time of the video display unit; and
   setting the scheduled time broadcast rate to a value of a highest one of the time broadcast rates in the set of time broadcast rates.

3. The inflight entertainment system of claim 1, wherein the operations to determine a scheduled time broadcast rate based on the indications of the time broadcast rates requested by the user terminals, further comprise:
   determining a relative priority level of each of the time broadcast rates requested by the user terminals; and
   determining the scheduled time broadcast rate based on one of the time broadcast rates having a priority level that satisfies a defined prioritization rule.

4. The inflight entertainment system of claim 3, wherein:
   the rate request messages received from the user terminals further contain an indication of a priority level; and
   the relative priority levels of the time broadcast rates requested by the user terminals are determined based on the associated indications of the priority levels received in the rate request messages.

5. The inflight entertainment system of claim 3, wherein:
   the rate request messages received from the user terminals each contain an indication of which type of service from among a plurality of defined types of services that can be provided by the user terminals will be using the present local times transmitted by the video display unit via the broadcast time messages; and
   the relative priority levels of the time broadcast rates requested by the user terminals are determined based on the types of service indicated by the associated rate request messages.

6. The inflight entertainment system of claim 5, wherein the operations to determine the relative priority levels of the time broadcast rates requested by the user terminals, based on the types of service indicated by the associated rate request messages, comprise:
   providing a first priority level to a time broadcast rate requested by one of the user terminals that will be using the present local times transmitted by the video display unit to report ranging indications to the video display unit; and
   providing a second priority level to another time broadcast rate requested by another one of the user terminals that will be using the present local times transmitted by the video display unit to report user commands that have been entered through the user terminal to the video display unit,
   wherein the operations to determine a scheduled time broadcast rate based on the indications of the time broadcast rates requested by the user terminals provide a higher priority to selecting the time broadcast rate associated with the first priority level over the time broadcast rate associated with the second priority level.

7. The inflight entertainment system of claim 1, wherein the operations to determine a scheduled time broadcast rate based on the indications of the time broadcast rates requested by the user terminals, further comprise:
   identifying one of the user terminals that has had an operational error that is related to a service performed by the user terminal which uses the present local times transmitted by the video display unit via the broadcast time messages; and
   setting the scheduled time broadcast rate to be at least as high as the time broadcast rate that was requested by the user terminal.

8. The inflight entertainment system of claim 7, wherein the operations to identify one of the user terminals that has had an operational error that is related to a service performed by the user terminal which uses the present local times transmitted by the video display unit via the broadcast time messages, further comprise:
   identifying that the user terminal has exhibited a lack of communication response to the video display unit responsive to communication signaling transmitted by the video display unit through the Bluetooth transceiver and/or a communication response latency which exceeds a latency threshold in responding to the communication signaling.

9. The inflight entertainment system of claim 8, wherein the operations to identify one of the user terminals that has had an operational error that is related to a service performed by the user terminal which uses the present local times transmitted by the video display unit via the broadcast time messages, further comprise:
identifying that the user terminal is reporting range indications from the video display unit that have errors exceeding an error threshold.

10. The inflight entertainment system of claim 1, wherein the operations to determine a scheduled time broadcast rate based on the indications of the time broadcast rates requested by the user terminals, further comprise:
communicating with other ones of the video display units via the network interface to obtain therefrom a list of user terminals that are determined by the other ones of the video display units to be within their respective communication range; and
providing a higher priority to determining the scheduled time broadcast rate to be at least as high as a highest one of the indications of the time broadcast rates that are requested by any of the user terminals that are determined to be within the communication range of the video display unit but to not be contained in any of the lists of the user terminals that are received from the other ones of the video display units.

11. The inflight entertainment system of claim 1, wherein the operations to determine a scheduled time broadcast rate based on the indications of the time broadcast rates requested by the user terminals, further comprise:
communicating with other ones of the video display units via the network interface to obtain therefrom a list of user terminals that are determined by the other ones of the video display units to be within their respective communication range and to obtain indications of time broadcast rates that have been requested by the user terminals in the list; and
determining a scheduled time broadcast rate based on the indications of the time broadcast rates indicated by the time reference messages received by the video display unit and further based on the indications of the time broadcast rates that have been requested by the user terminals in the list.

12. The inflight entertainment system of claim 1, wherein the operations further comprise:
communicating with other ones of the video display units via the network interface to coordinate different broadcast time offset values, wherein each respective one of the video display units performs operation to determine repetitive occurrence of the time instances, when the broadcast time messages are transmitted through the Bluetooth transceiver of the respective video display unit, based on a combination of the random time offset value of the respective video display unit and the present local times of the respective video display unit that are generated by the local time generator of the respective video display unit.

13. A Bluetooth controller for distributing a precision local time to user terminals, the Bluetooth controller comprising:
a network interface configured to communicate with a precision time source node;
a Bluetooth transceiver configured to communicate through Bluetooth signaling with the user terminals;
at least one processor; and
at least one memory storing program code executed by the at least one processor to perform operations comprising:
receiving a time reference message containing a master time reference from the precision time source node;
updating a local time generator based on the master time reference;
receiving rate request messages from user terminals via the Bluetooth transceiver, each of the rate request messages containing an indication of a time broadcast rate that is requested by the user terminal respectively;
determining a scheduled time broadcast rate based on the indications of the time broadcast rates requested by the user terminals; and
transmitting through the Bluetooth transceiver, at time instances which are determined based on the scheduled time broadcast rate, broadcast time messages that each contain an indication of a present local time of the video display unit that is generated by the local time generator.

14. The Bluetooth controller of claim 13, wherein the operations to determine a scheduled time broadcast rate based on the indications of the time broadcast rates requested by the user terminals, further comprise:
determining from the rate request messages a set of time broadcast rates that the user terminals are requesting that the video display unit broadcast the indications of the present local time of the video display unit; and
setting the scheduled time broadcast rate to a value of a highest one of the time broadcast rates in the set of time broadcast rates.

15. The Bluetooth controller of claim 13, wherein the operations to determine a scheduled time broadcast rate based on the indications of the time broadcast rates requested by the user terminals, further comprise:
generating from the rate request messages a set of time broadcast rates that the user terminals are requesting and a count of how many times each of the time broadcast rates in the set is requested; and
determining the scheduled time broadcast rate based on an algorithmic combination of the time broadcast rates in the list and the count of how many times each of the time broadcast rates is requested.

16. The Bluetooth controller of claim 13, wherein the operations to determine a scheduled time broadcast rate based on the indications of the time broadcast rates requested by the user terminals, further comprise:
determining a relative priority level of each of the time broadcast rates requested by the user terminals; and
determining the scheduled time broadcast rate based on one of the time broadcast rates having a priority level that satisfies a defined prioritization rule.

17. The Bluetooth controller of claim 16, wherein:
the rate request messages received from the user terminals further contain an indication of a priority level; and
the relative priority levels of the time broadcast rates requested by the user terminals are determined based on the associated indications of the priority levels received in the rate request messages.

18. The Bluetooth controller of claim 16, wherein:
the rate request messages received from the user terminals each contain an indication of which type of service from among a plurality of defined types of services that can be provided by the user terminals will be using the present local times transmitted by the video display unit via the broadcast time messages; and the relative priority levels of the time broadcast rates requested by the user terminals are determined based on the types of service indicated by the associated rate request messages.

19. The Bluetooth controller of claim 18, wherein the operations to determine the relative priority levels of the time broadcast rates requested by the user terminals, based on the types of service indicated by the associated rate request messages, comprise:

providing a first priority level to a time broadcast rate requested by one of the user terminals that will be using the present local times transmitted by the video display unit to report ranging indications to the video display unit; and providing a second priority level to another time broadcast rate requested by another one of the user terminals that will be using the present local times transmitted by the video display unit to report user commands that have been entered through the user terminal to the video display unit, wherein the operations to determine a scheduled time broadcast rate based on the indications of the time broadcast rates requested by the user terminals provide a higher priority to selecting the time broadcast rate associated with the first priority level over the time broadcast rate associated with the second priority level.

20. The Bluetooth controller of claim 13, wherein the operations to determine a scheduled time broadcast rate based on the indications of the time broadcast rates requested by the user terminals, further comprise:

identifying one of the user terminals that has had an operational error that is related to a service performed by the user terminal which uses the present local times transmitted by the video display unit via the broadcast time messages; and setting the scheduled time broadcast rate to be at least as high as the time broadcast rate that was requested by the user terminal.

21. The Bluetooth controller of claim 20, wherein the operations to identify one of the user terminals that has had an operational error that is related to a service performed by the user terminal which uses the present local times transmitted by the video display unit via the broadcast time messages, further comprise:

identifying that the user terminal has exhibited a lack of communication response to the video display unit responsive to communication signaling transmitted by the video display unit through the Bluetooth transceiver and/or a communication response latency which exceeds a latency threshold in responding to the communication signaling.

22. The Bluetooth controller of claim 20, wherein the operations to identify one of the user terminals that has had an operational error that is related to a service performed by the user terminal which uses the present local times transmitted by the video display unit via the broadcast time messages, further comprise:

identifying that the user terminal is reporting range indications from the video display unit that have errors exceeding an error threshold.

23. The Bluetooth controller of claim 13, wherein the operations further comprise:

communicating with other video display units via the network interface to coordinate different time offsets between their respective transmissions through their respective Bluetooth transceiver at respective time instances that are based on their respective scheduled time broadcast rate.

24. The Bluetooth controller of claim 13, wherein the operations further comprise:

determining a random time offset value;

determining repetitive occurrence of the time instances, when the broadcast time messages are transmitted through the Bluetooth transceiver, based on a combination of the random time offset value and the present local times of the video display unit that are generated by the local time generator.

25. A method of providing inflight entertainment, the method comprising:

receiving control commands from user terminals via a Bluetooth transceiver;

obtaining entertainment content from a content server and controlling display of the entertainment content on a display device responsive to the control commands;

receiving a time reference message containing a master time reference from a satellite network interface and/or from a ground network interface;

updating a local time generator based on the master time reference;

receiving rate request messages from the user terminals via the Bluetooth transceiver, each of the rate request messages containing an indication of a time broadcast rate that is requested by the user terminal respectively;

determining a scheduled time broadcast rate based on the indications of the time broadcast rates requested by the user terminals; and transmitting through the Bluetooth transceiver, at time instances which are determined based on the scheduled time broadcast rate, broadcast time messages that each contain an indication of a present local time of a video display unit that is generated by the local time generator.

* * * * *